(12) United States Patent
Rodgers

(10) Patent No.: US 9,241,217 B2
(45) Date of Patent: Jan. 19, 2016

(54) DYNAMICALLY ADJUSTED STEREO FOR PORTABLE DEVICES

(71) Applicant: EchoStar Technologies L.L.C., Englewood, CO (US)

(72) Inventor: Joshua Rodgers, Cheyenne, WY (US)

(73) Assignee: EchoStar Technologies L.L.C., Englewood, CA (US)

(*) Notice: Subject to any disclaimer, the term of this patent is extended or adjusted under 35 U.S.C. 154(b) by 150 days.

(21) Appl. No.: 14/138,348

(22) Filed: Dec. 23, 2013

(65) Prior Publication Data

US 2015/0181337 A1    Jun. 25, 2015

(51) Int. Cl.
*H04R 5/02*  (2006.01)
*G06F 3/16*  (2006.01)
*G06F 1/16*  (2006.01)

(52) U.S. Cl.
CPC ............ *H04R 5/02* (2013.01); *G06F 1/1688* (2013.01); *G06F 1/1694* (2013.01); *G06F 3/165* (2013.01); *G06F 2200/1614* (2013.01); *G06F 2200/1637* (2013.01)

(58) Field of Classification Search
CPC ............ H04R 5/02; H04R 3/12; H04R 1/403; H04R 27/00; H04R 2205/024; H04R 2205/022
USPC ......................................................... 381/303
See application file for complete search history.

(56) References Cited

U.S. PATENT DOCUMENTS

| | | |
|---|---|---|
| 2011/0002487 A1 | 1/2011 | Panther et al. |
| 2011/0150247 A1 | 6/2011 | Oliveras |
| 2013/0163794 A1* | 6/2013 | Groves et al. ................. 381/303 |

OTHER PUBLICATIONS

International Search Report for PCT/US2014/062079 dated Jan. 9, 2015 (10 pages).

* cited by examiner

*Primary Examiner* — Mark Blouin
(74) *Attorney, Agent, or Firm* — Bejin Bieneman PLC

(57) ABSTRACT

A mobile device includes an orientation sensor configured to detect an orientation of the mobile device and at least two speakers, each configured to output sound according to an audio signal. The mobile device further includes a processing device configured to group at least two of the speakers into a speaker pair based on the orientation detected by the orientation sensor.

18 Claims, 2 Drawing Sheets

DYNAMICALLY ADJUSTED STEREO FOR PORTABLE DEVICES

BACKGROUND

Certain screen images presented on some mobile devices can change as the orientation of the device changes. A user may orient the mobile device according to the content presented to make viewing the content easier. For example, the user may hold the mobile device in a portrait orientation when the content is text from, e.g., an email, an article on a webpage, or an e-book, and in a landscape orientation when the content is a video presented in, e.g., a 4:3 or 16:9 format. Changing the screen orientation with the orientation of the mobile device allows the user to decide the best orientation for viewing the content.

DETAILED DESCRIPTION

An exemplary mobile device includes an orientation sensor configured to detect an orientation of the mobile device and at least two speakers, each configured to output sound according to an audio signal. The mobile device further includes a processing device configured to group at least two of the speakers into a speaker pair based on the orientation detected by the orientation sensor. Thus, the sound output may be dynamically adjusted along with screen images as the mobile device is rotated to different orientations so that, e.g., the left channel audio will be played by the left speakers and the right channel audio will be played by the right speakers relative to a user.

The mobile device shown in the FIGS. may take many different forms and include multiple and/or alternate components and facilities. While an exemplary mobile device is shown, the exemplary components illustrated are not intended to be limiting. Indeed, additional or alternative components and/or implementations may be used.

Figure 1A:
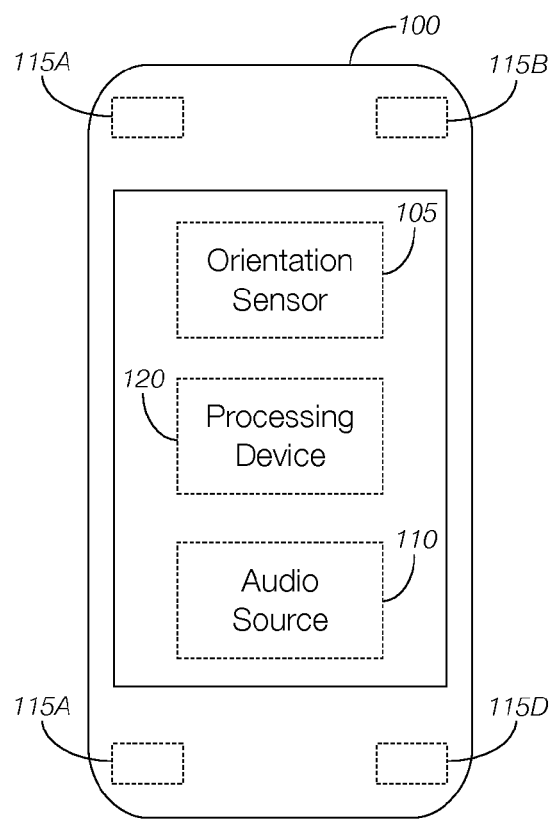
FIG. 1A illustrates an exemplary mobile device, having dynamically adjusted speaker output, in a first orientation.
Figure 1B:
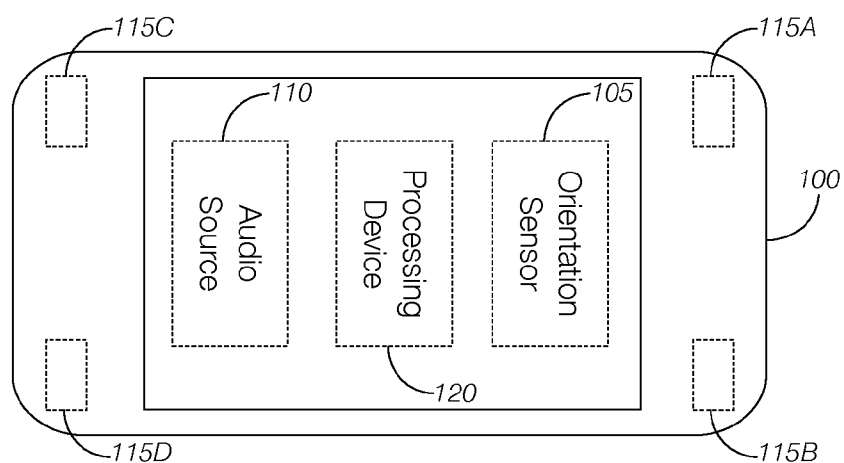
FIG. 1B illustrates the mobile device of FIG. 1A in a second orientation.
Figure 1C:
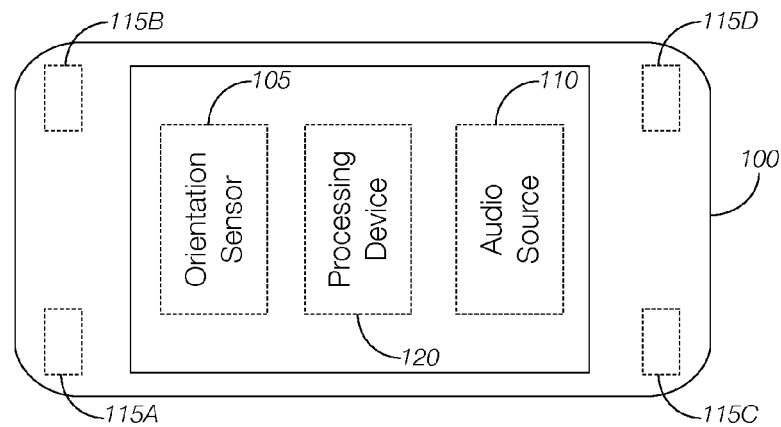
FIG. 1C illustrates the mobile devices of FIGS. 1A and 1B in a third orientation.

As illustrated in FIGS. 1A-1C, the mobile device 100 includes an orientation sensor 105, an audio source 110, a plurality of speakers 115, and a processing device 120. The mobile device 100 may include any handheld device configured to present content to a user. Examples of mobile devices 100 may include mobile phones, tablet computers, handheld gaming devices, portable navigation devices, portable music players, or the like.

The orientation sensor 105 may be configured to detect an orientation of the mobile device 100. The orientation sensor 105 may include a gyroscope that determines orientation based on angular momentum or an accelerometer that can be used to determine orientation based on acceleration. The orientation sensor 105 may be configured to output a signal representing the orientation of the mobile device 100. The orientation signal may represent an absolute orientation or a change in orientation from a previous value. Examples of orientations may include a portrait orientation and a landscape orientation. If the mobile device 100 has a generally rectangular shape (i.e., with two non-adjoining sides longer than two transverse sides), the mobile device 100 may be in the portrait orientation if the height is greater than the width and in the landscape orientation if the width is greater than the height.

The audio source 110 may be configured to output signals representing sound generated by the mobile device 100. The sound may be based on music played by the mobile device 100 or may accompany a video presented on a display screen. The audio source 110 may be configured to output signals representing stereophonic sound having at least two channels. One channel may be referred to as a "left" channel and the other channel may be referred to as a "right" channel. The audio source 110 may output signals representing other channels in addition to the signals representing the left channel and the right channel.

The speakers 115 may be configured to generate sound from audio signals generated by the audio source 110. In general, each speaker 115 may include an electroacoustic transducer that converts an electrical signal into sound. For instance, the electrical signals output by the audio source 110 may cause a component of the speaker 115 to vibrate at a frequency dictated by the audio signals received. The speakers 115 may be configured to generate sounds within a range of frequencies. Some speakers 115 may be configured to receive different audio signals and therefore output different sounds. For instance, at least one speaker 115 may receive the left channel signal while at least one other speaker 115 may receive the right channel signal. Moreover, the speakers 115 may be grouped, as discussed in greater detail below. The speakers 115 in each group may receive the same audio signal. That is, the speakers 115 in one group may receive the left channel signal and the speakers 115 in another group may receive the right channel signal. The mobile device 100 of FIGS. 1A-1C includes a first speaker 115A, a second speaker 115B, a third speaker 115C, and a fourth speaker 115D. While four speakers 115 are shown, certain implementations may allow the mobile device 100 to have as few as two speakers 115 and possibly more than two speakers 115.

The processing device 120 may be configured to receive the orientation signal and group at least two of the speakers 115 into a speaker 115 pair based on the orientation of the mobile device 100. The processing device 120 may group speakers 115 by adjusting an output of each speaker 115 so that grouped speakers 115 will receive different audio signals. In the example shown in FIG. 1A, when the mobile device 100 is in the portrait orientation, the processing device 120 may group the first speaker 115A with the second speaker 115B and group the third speaker 115C with the fourth speaker 115D. The first speaker 115A and the third speaker 115C may receive one audio signal, such as the left channel signal, and the second speaker 115B and the fourth speaker 115D may receive a different audio signal, such as the right channel signal.

The processing device 120 may be configured to detect a change in orientation of the mobile device 100 from the orientation signal output by the orientation sensor 105. Referring to FIG. 1B, showing the landscape orientation, the processing device 120 may adjust the groups so that the first speaker 115A is grouped with the third speaker 115C and the second speaker 115B is grouped with the fourth speaker 115D. With these groupings, the first speaker 115A and the second speaker 115B may receive one audio signal, such as the right channel signal, and the third speaker 115C and the fourth speaker 115D may receive a different audio signal, such as the left channel signal. FIG. 1C illustrates another approach where the mobile device 100 is in the landscape orientation with the same groupings as those described with respect to FIG. 1B except that the first speaker 115A and the second speaker 115B receive the left channel signal and the third speaker 115C and the fourth speaker 115D receive the right channel signal.

The processing device 120 may not provide a different audio signal to each speaker 115 after every orientation change. In implementations where the mobile device 100 has more than two speakers 115, at least one speaker 115 may continue to receive the same audio signal before and after a change in orientation. For example, with reference to FIGS. 1A and 1B, the third speaker 115C may receive the left channel signal in both the landscape and portrait orientations. Likewise, the second speaker 115B may receive the right channel signal in both the landscape and portrait orientations. The first speaker 115A and the fourth speaker 115D, however, may receive different audio signals when the orientation changes. As mentioned above, the first speaker 115A may receive the left channel signal when the mobile device 100 is in the portrait orientation and the right channel signal when the mobile device 100 is in the landscape orientation shown in FIG. 1B. The fourth speaker 115D may receive the right channel speaker 115 when in the mobile device 100 is in the portrait orientation and the left channel signal when the mobile device 100 is in the landscape orientation shown in FIG. 1B. When the orientation changes between the portrait orientation and the landscape orientation shown in FIG. 1C, the first speaker 115A and the fourth speaker 115D may receive the same audio signals while the second speaker 115B and the third speaker 115C receive different audio signals.

In general, computing systems and/or devices, such as the processing device 120, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
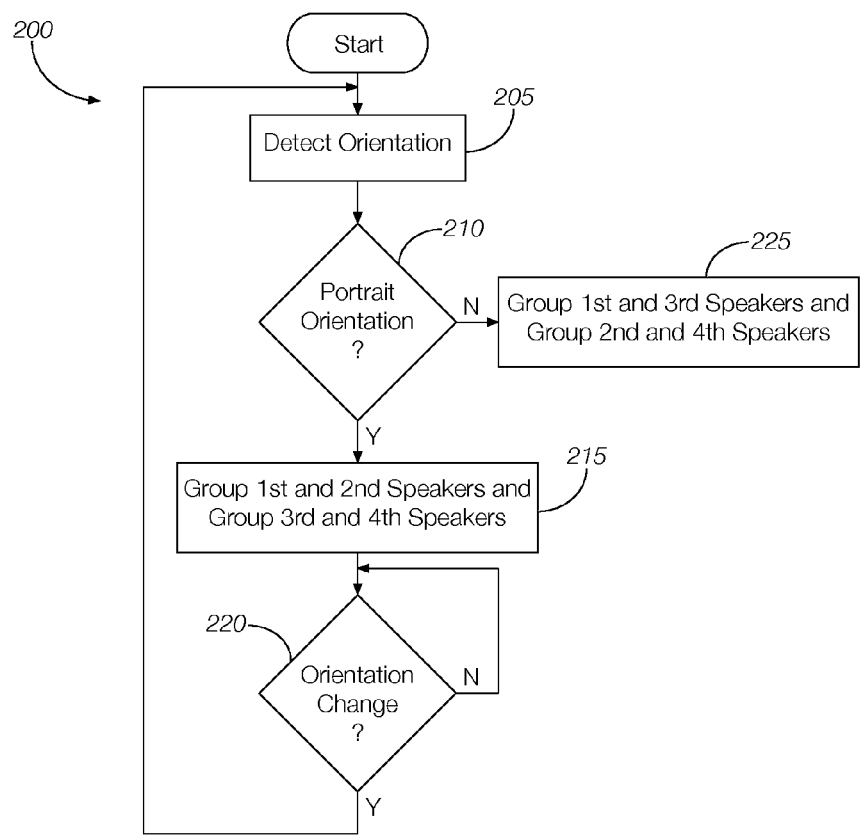
FIG. 2 is a flowchart of an exemplary process that may be used to dynamically adjust the speaker output of the mobile devices of FIGS. 1A-1C.

FIG. 2 is a flowchart of an exemplary process 200 that may be implemented by one or more components of the mobile devices 100 of FIGS. 1A-1C. For instance, the process 200 may be executed by the processing device 120.

At block 205, the processing device 120 may detect a current orientation of the mobile device 100. The current orientation may be determined from the orientation signal generated and output by the orientation sensor 105. Examples of orientations may include a portrait orientation as shown in FIG. 1A and landscape orientations shown in FIGS. 1B and 1C.

At decision block 210, the processing device 120 may determine whether the current orientation is the portrait orientation or the landscape orientation. If the mobile device 100 has a generally rectangular shape (i.e., at least one side is longer than a transverse side), the mobile device 100 may be in the portrait orientation if the height is greater than the width and in the landscape orientation if the width is greater than the height. If in the portrait orientation, the process 200 may continue at block 215. If in the landscape orientation, the process 200 may continue at block 225.

At block 215, the processing device 120 may group the first speaker 115A with the second speaker 115B. In implementations with four speakers 115, the processing device 120 may further group the third speaker 115C with the fourth speaker 115D. The first speaker 115A and the third speaker 115C may receive one audio signal, such as a left channel signal and the second speaker 115B and the fourth speaker 115D may receive a different audio signal, such as a right channel signal.

At decision block 220, the processing device 120 may determine whether the orientation has changed. If the orientation has changed, the process 200 may continue at block 205 so that the new orientation can be determined. If the orientation has not changed, the process 200 may repeat decision block 220 until, e.g., the processing device 120 detects that the orientation has changed.

At block 225, the processing device 120 may group the first speaker 115A with the third speaker 115C and the second speaker 115B with the fourth speaker 115D. With this grouping of speakers 115, the processing device 120 may provide one audio signal to the first speaker 115A and the second speaker 115B and a different audio signal to the third speaker 115C and the fourth speaker 115D. The audio signals provided to each speaker 115 may depend on whether the landscape orientation is more similar to that shown in FIG. 1B or FIG. 1C. The process 200 may continue at block 220.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile device comprising:
an orientation sensor configured to detect a first orientation of the mobile device;
at least two speakers, wherein each speaker is configured to output sound according to an audio signal; and
a processing device programmed to group at least two of the speakers into a speaker pair based on the first orientation detected by the orientation sensor and detect a change in orientation of the mobile device based on an orientation change signal output by the orientation sensor,
wherein the processing device is programmed to wait for the orientation change signal, and determine a second orientation of the mobile device in response to receiving the orientation change signal after the change in orientation of the mobile device is detected by the orientation sensor and maintain the speaker pair while waiting for the orientation change signal.

2. The mobile device of claim 1, wherein the processing device is configured to adjust an output of each speaker according to the second orientation detected by the orientation sensor.

3. The mobile device of claim 1, further comprising:
an audio source configured to output a first audio signal and a second audio signal,
wherein the at least two speakers includes a first speaker and a second speaker, and
wherein the processing device is programmed to provide the first audio signal to the first speaker and the second audio signal to the second speaker when the mobile device is in the first orientation.

4. The mobile device of claim 3, wherein the processing device is programmed to provide the second audio signal to the first speaker and the first audio signal to the second speaker when the mobile device is in the second orientation.

5. The mobile device of claim 1, wherein the at least two speakers includes a first speaker, a second speaker, and a third speaker, and wherein the processing device is programmed to group the first speaker and the second speaker when the mobile device is in the first orientation and the first speaker and the third speaker when the mobile device is in the second orientation.

6. The mobile device of claim 5, wherein the at least two speakers includes a fourth speaker, and wherein the processing device is programmed to group the third speaker and the fourth speaker when the mobile device is in the first orientation and the second speaker and the fourth speaker when the mobile device is in the second orientation.

7. The mobile device of claim 6, wherein, when the mobile device is in the first orientation, the processing device is programmed to provide a first audio signal to the first speaker and the third speaker and a second audio signal to the second speaker and the fourth speaker.

8. The mobile device of claim 7, wherein, when the mobile device is in the second orientation, the processing device is programmed to provide the first audio signal to the third speaker and the fourth speaker and the second audio signal to the first speaker and the second speaker.

9. The mobile device of claim 8, wherein the first audio signal represents a left audio channel and wherein the second audio signal represents a right audio channel.

10. A method comprising:
detecting a first orientation of a mobile device;
grouping at least two speakers into a speaker pair based on the first orientation;
waiting for an orientation change signal indicating that the orientation of the mobile device has changed;
maintaining the speaker pair while waiting for the orientation change signal; and
if orientation change signal indicates that the orientation of the mobile device has changed:
detecting a second orientation of the mobile device, and
adjusting an output of each speaker according to the second orientation.

11. The method of claim 10, wherein grouping at least two speakers includes providing a first audio signal to the first speaker and a second audio signal to the second speaker when the mobile device is in the first orientation.

12. The method of claim 11, further comprising providing the second audio signal to the first speaker and the first audio signal to the second speaker when the mobile device is in the second orientation.

13. The method of claim 10, wherein the at least two speakers includes a first speaker, a second speaker, and a third speaker, and wherein grouping the at least two speakers includes grouping the first speaker with the second speaker when the mobile device is in the first orientation and grouping the first speaker with the third speaker when the mobile device is in the second orientation.

14. The method of claim 13, wherein the at least two speakers includes a fourth speaker, and wherein grouping the at least two speakers includes grouping the third speaker with the fourth speaker when the mobile device is in the first orientation and grouping the second speaker with the fourth speaker when the mobile device is in the second orientation.

15. The method of claim 14, wherein grouping the at least two speakers includes providing a first audio signal to the first speaker and the third speaker and a second audio signal to the second speaker and the fourth speaker when the mobile device is in the first orientation.

16. The method of claim 15, wherein grouping the at least two speakers includes providing the first audio signal to the third speaker and the fourth speaker and the second audio signal to the first speaker and the second speaker when the mobile device is in the second orientation.

17. A mobile device comprising:
an orientation sensor configured to detect an orientation of the mobile device and a change in the orientation of the mobile device, the orientation including a first orientation and a second orientation, wherein the orientation sensor is programmed to output an orientation change signal in response to detecting a change in the orientation of the mobile device;
an audio source configured to output a first audio signal and a second audio signal,
a plurality of speakers including a first speaker, a second speaker, a third speaker, and a fourth speaker, wherein each speaker is configured to output sound according to at least one of the first audio signal and the second audio signal;
a processing device programmed to group at least two of the speakers into a speaker pair based on the orientation detected by the orientation sensor, wherein grouping the at least two speakers includes, when the mobile device is in the first orientation, providing the first audio signal to the first speaker and the third speaker and the second audio signal to the second speaker and the fourth speaker and, when the mobile device is in the second orientation, providing the first audio signal to the third speaker and the fourth speaker and the second audio signal to the second speaker and the fourth speaker, and
wherein the processing device is programmed to wait for the orientation change signal, detect the change in orientation of the mobile device based on the orientation change signal, and, in response to receiving the orientation change signal, determine a second orientation of the mobile device after the change in orientation of the mobile device is detected, and wherein the processing device is programmed to maintain the speaker pair while waiting for the orientation change signal.

18. The mobile device of claim 17, wherein the first audio signal represents a left audio channel and the second audio signal represents a right audio channel.

* * * * *